United States Patent
Bharti et al.

(10) Patent No.: US 12,143,453 B2
(45) Date of Patent: Nov. 12, 2024

(54) HYBRID EDGE COMPUTING

(71) Applicant: INTERNATIONAL BUSINESS MACHINES CORPORATION, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/570,036

(22) Filed: Jan. 6, 2022

(65) Prior Publication Data
US 2023/0216928 A1  Jul. 6, 2023

(51) Int. Cl.
*H04L 67/51* (2022.01)
*G06N 5/01* (2023.01)
*H04L 41/0893* (2022.01)
*H04L 41/0896* (2022.01)
*H04L 41/28* (2022.01)

(52) U.S. Cl.
CPC .............. *H04L 67/51* (2022.05); *G06N 5/01* (2023.01); *H04L 41/0893* (2013.01); *H04L 41/0896* (2013.01); *H04L 41/28* (2013.01)

(58) Field of Classification Search
CPC . H04L 67/51; H04L 41/0893; H04L 41/0896; H04L 41/28; G06N 5/003
See application file for complete search history.

(56) References Cited

U.S. PATENT DOCUMENTS

| 10,193,753 | B1 * | 1/2019 | Tabet | H04L 41/0843 |
| 10,567,269 | B2 * | 2/2020 | Chakra | H04L 45/70 |
| 10,757,104 | B1 * | 8/2020 | Goel | H04L 63/08 |
| 10,956,242 | B1 * | 3/2021 | Kumar | G06F 8/76 |

(Continued)

FOREIGN PATENT DOCUMENTS

| CN | 109074283 A | * | 12/2018 | ......... G06F 9/45558 |
| CN | 112600895 A | * | 4/2021 | ............. H04L 67/10 |

(Continued)

OTHER PUBLICATIONS

Mell, Peter, et al., "The NIST Definition of Cloud Computing," Sep. 2011, 7 pages.

(Continued)

*Primary Examiner* — Shean Tokuta
(74) *Attorney, Agent, or Firm* — Tutunjian & Bitetto, P.C.; Michael A. Petrocelli

(57) ABSTRACT

Hybrid edge computing that includes a nimble framework that identifies services for available in a marketplace. The nimble framework defines a location for computing the services selected from the group consisting of a center server, an edge provision server and an edge node. The hybrid edge computing further includes a third party provider making are request for a service to the nimble framework. The hybrid edge computing further includes a virtualized service being provided by the nimble framework to the third party provider including a matched service to the third party provider request for the service, and an optimal location for computing.

18 Claims, 5 Drawing Sheets

(56) References Cited

U.S. PATENT DOCUMENTS

| | | | |
|---|---|---|---|
| 11,032,164 B1* | 6/2021 | Rothschild | H04L 41/40 |
| 11,108,840 B2* | 8/2021 | Shi | H04L 65/75 |
| 11,316,757 B1* | 4/2022 | Eliav | G06F 8/60 |
| 11,481,514 B1* | 10/2022 | Li | H04L 63/0245 |
| 11,516,628 B2* | 11/2022 | Sodagar | H04L 65/61 |
| 11,671,325 B1* | 6/2023 | Kuo | H04L 41/0873 |
| | | | 709/220 |
| 2008/0183544 A1* | 7/2008 | Matsumitsu | G06F 9/505 |
| | | | 705/7.26 |
| 2016/0366246 A1* | 12/2016 | Battle | G06F 9/5055 |
| 2019/0199695 A1 | 6/2019 | Bhardwaj et al. | |
| 2019/0281055 A1* | 9/2019 | Bhargava | H04L 63/0892 |
| 2020/0084202 A1* | 3/2020 | Smith | H04W 12/08 |
| 2020/0177576 A1* | 6/2020 | Vudathu | H04L 63/0815 |
| 2020/0351340 A1* | 11/2020 | Zavesky | H04L 67/10 |
| 2021/0089239 A1* | 3/2021 | Liguori | G06F 3/067 |
| 2021/0096825 A1* | 4/2021 | Gray | G06F 8/30 |
| 2021/0097449 A1* | 4/2021 | Chattopadhyay | G06N 20/20 |
| 2021/0110310 A1* | 4/2021 | Guim Bernat | G06F 16/27 |
| 2021/0144517 A1* | 5/2021 | Guim Bernat | H04L 41/0869 |
| 2021/0168027 A1* | 6/2021 | Parulkar | H04L 41/147 |
| 2021/0240459 A1* | 8/2021 | Ranjan | G06F 9/5055 |
| 2022/0086218 A1* | 3/2022 | Sabella | H04M 15/66 |
| 2022/0174485 A1* | 6/2022 | Abhigyan | H04W 12/06 |
| 2022/0174486 A1* | 6/2022 | Abhigyan | H04L 67/1012 |
| 2022/0245904 A1* | 8/2022 | Saxena | G06F 11/3419 |
| 2023/0216928 A1* | 7/2023 | Bharti | H04L 67/52 |
| | | | 709/224 |

FOREIGN PATENT DOCUMENTS

| | | | | |
|---|---|---|---|---|
| CN | 113300899 B | * | 8/2022 | H04L 43/08 |
| CN | 114902182 A | * | 8/2022 | G06F 9/45558 |
| CN | 115004661 A | * | 9/2022 | G06F 9/4856 |
| CN | 115168020 A | * | 10/2022 | G06F 8/60 |
| WO | WO-2020207264 A1 | * | 10/2020 | H04L 41/0893 |
| WO | WO-2021138069 A1 | * | 7/2021 | H04W 4/40 |
| WO | WO-2021221736 A2 | * | 11/2021 | H04B 7/1851 |
| WO | WO-2021238771 A1 | * | 12/2021 | |
| WO | WO-2022075737 A1 | * | 4/2022 | H04L 67/1095 |
| WO | WO-2022174725 A1 | * | 8/2022 | H04L 45/0377 |

OTHER PUBLICATIONS

Tourani, Reza, et al., "Democratizing the edge: A pervasive edge computing framework," arXiv preprint arXiv:2007.00641, Jul. 2020, 7 pages.

* cited by examiner

HYBRID EDGE COMPUTING

BACKGROUND

The present disclosure generally relates to distributed computing environments, and more particularly to edge computing.

Edge computing is a topology in distributed computing paradigm where computation and data storage are bought closer to the location where it is needed. Therefore, broadly instead of doing all computing at the cloud, some of the computing can be done at the edge of the network, specifically in devices/application where real time data processing is required. In most scenarios, the consumer needs the services from a provider, as per agreed quality of services.

In current as-is scenarios, if a consumer needs a service that is outside the current remit of the network reach or within the internet worked scope then it not straightforwardly possible. Even if it's done, the central cloud servers will be employed that do not align with the inherit edge computing benefits that are driving the end consumer request/requirement.

SUMMARY

In accordance with one aspect of the present disclosure, a computer-implemented method for hybrid edge computing is provided. In one embodiments, the computer-implemented method includes a nimble framework that identifies services for available in a marketplace. The nimble framework defines a location for computing the services selected from the group consisting of a center server, an edge provision server and an edge node. The computer-implemented method further includes a third party provider making are request for a service to the nimble framework. The computer implemented method further includes a virtualized service being provided by the nimble framework to the third party provider including a matched service to the third party provider request for the service, and an optimal location for computing.

In another aspect, a system is described for hybrid edge computing. The system can include a hardware processor; and a memory that stores a computer program product. The computer program product when executed by the hardware processor, causes the hardware processor to create an entity relationship diagram that includes a nimble framework that identifies services for available in a marketplace. The system can also define a location for computing the services selected from the group consisting of a center server, an edge provision server and an edge node. The system further receives a request from a third party provider for a service to the nimble framework. The system can further deliver a virtualized service by the nimble framework to the third party provider including a matched service to the third party provider request for the service, and an optimal location for computing.

In yet another aspect, a computer program product is described for hybrid edge computing. The computer program product can include a computer readable storage medium having computer readable program code embodied therewith. The program instructions executable by a processor to cause the processor to create an entity relationship diagram that includes a nimble framework that identifies services for available in a marketplace. The computer program product can also define, using the processor, a location for computing the services selected from the group consisting of a center server, an edge provision server and an edge node. The computer program product can further receive, using the processor, a request from a third party provider for a service to the nimble framework. The computer program product can further deliver, using the processor a virtualized service by the nimble framework to the third party provider including a matched service to the third party provider request for the service, and an optimal location for computing.

BRIEF DESCRIPTION OF THE DRAWINGS

The following description will provide details of preferred embodiments with reference to the following figures wherein.

DETAILED DESCRIPTION

Figure 1:
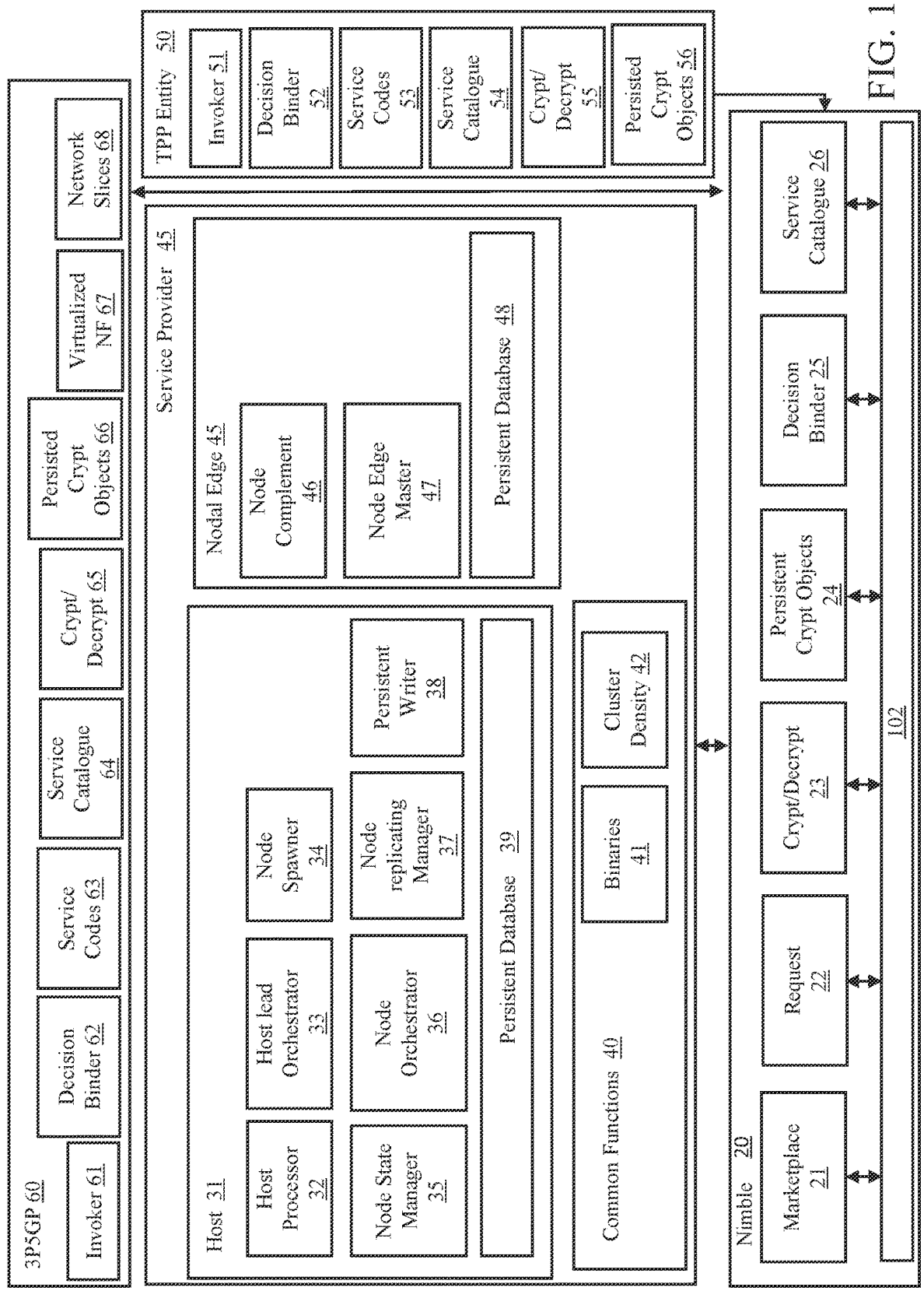
FIG. 1 is a block diagram illustrating a framework for hybrid edge computing.

The methods, systems, and computer program products described herein relate to hybrid edge computing.

"Edge computing" is a distributed computing model that takes advantage of compute available outside of traditional and cloud data centers. An edge computing model places a workload closer to where the associated data is created and where actions are taken in response to analysis of that data. Placing data and workload on edge devices reduces latencies, lowers demands on network bandwidth, increases privacy of sensitive information, and enables operations during network disruptions.

An "edge device" is a piece of equipment, such as an assembly machine on a factory floor, an ATM, an intelligent camera, or an automobile, that has integrated compute capacity on which meaningful work can be performed and data collected or produced.

An "edge gateway" is an edge server that has services that perform network functions such as protocol translation, network termination, tunneling, firewall protection, or wireless connections. An edge gateway serves as the connection point between an edge device or edge server and the cloud or a larger network.

An "edge node" is any edge device, edge server, or edge gateway where edge computing takes place.

An "edge server" is a computer in a remote operations facility that runs enterprise application workloads and shared services. An edge server can be used to connect to an edge device, connect to another edge server, or serve as an edge gateway for connecting to the cloud or to a larger network.

A "provisioning server" is a server that performs the process of setting up a server to be used in a network based on required resources.

An "edge service" is service that is designed specifically to be deployed on an edge server, edge gateway, or edge device. Visual recognition, acoustic insights, and speech recognition are all examples of potential edge services.

An "edge workload" is any service, microservice, or piece of software that does meaningful work when it runs on an edge node.

Edge computing is a topology in distributed computing paradigm where computation and data storage are bought closer to the location where it is needed. Therefore, instead of doing all computing at the cloud it will be done at the edge of the network, specifically in devices/application where real time data processing is required. In most of the scenario the consumer needs the services from provider as per agreed quality of services.

In current as-is scenario, if a consumer needs a service that is outside the current remit of the network reach, or within the internetworked scope then it not straightforwardly possible. Also, the central cloud servers (which can possibly be hybrid cloud servers) will come into play that do not align with the inherit edge computing benefits that is driving the end consumer request/requirement. This can bring everything within the network, which can complicate the services.

However, the methods, systems and computer program products that are described herein can create the hybrid experience at the edge itself using the proposed disclosure framework. The present invention is an attempt to provide the solution for this existing technical deficiency where power of edge computing is not optimally utilized, by introduction of a hybrid edge provisioning concept. The hybrid edge provisioning concept is primarily based on the concept of a nimble protocol. The nimble protocol that is disclosed herein is an invocation, decision binder, orchestrator and is secured with nimble crypt object implementation. The methods, systems and computer program products of the present disclosure further assist the organization to be digital autonomous.

Disclosed is a method/framework to provide a solution which is based upon a nimble framework invocation, a decision binder, an orchestrator, and a nimble crypt object, which can assist organizations to be digitally autonomous. The requestor system triggers the request for services. The decision binder identifies the service that is appropriately available in the marketplace.

The services implement the nimble framework and adopt the guidelines as required for services to be available in the marketplace. To avoid the chaos that can be caused by services that can't be called directly off the hook, consumers can add a decision binding element to establish methods of the Nimble framework.

As a service provider, the state of apparatus is to be made available at the edge of the requestor, as latency can render the application unfit. Network latency refers to the time packets take to traverse a network from one point to another. Edge computing architecture can reduce latency for time-sensitive resources, as well as the potential for bottlenecks.

Compute intensive operations are performed at the edge provisioning server (edge server), and comparatively less intensive operations are performed at the edge (edge node).

Depending on resource requirements runtime gets decided, now at this moment the proposed framework in disclosure comes into play, i.e., division or decision of runtime environment gets taken. For instance, depending on the latency requirement perspective runtime gets decided. If yes, then how much data, compute capacity, bandwidth is needed all gets considered in framework during provisioning of services at edge provisioning server or edge server. Based on the permissible latency defined the framework configures the services either at the edge provisioning server or at the edge server. In ideal scenario, its required that the wait time for the customer should be zero. The framework also ensures the transaction consistency across the entire systems i.e. the center server, the edge provisioning server, and the edge server.

The methods, systems and computer program products are now described in greater detail with reference to FIGS. 1-5.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
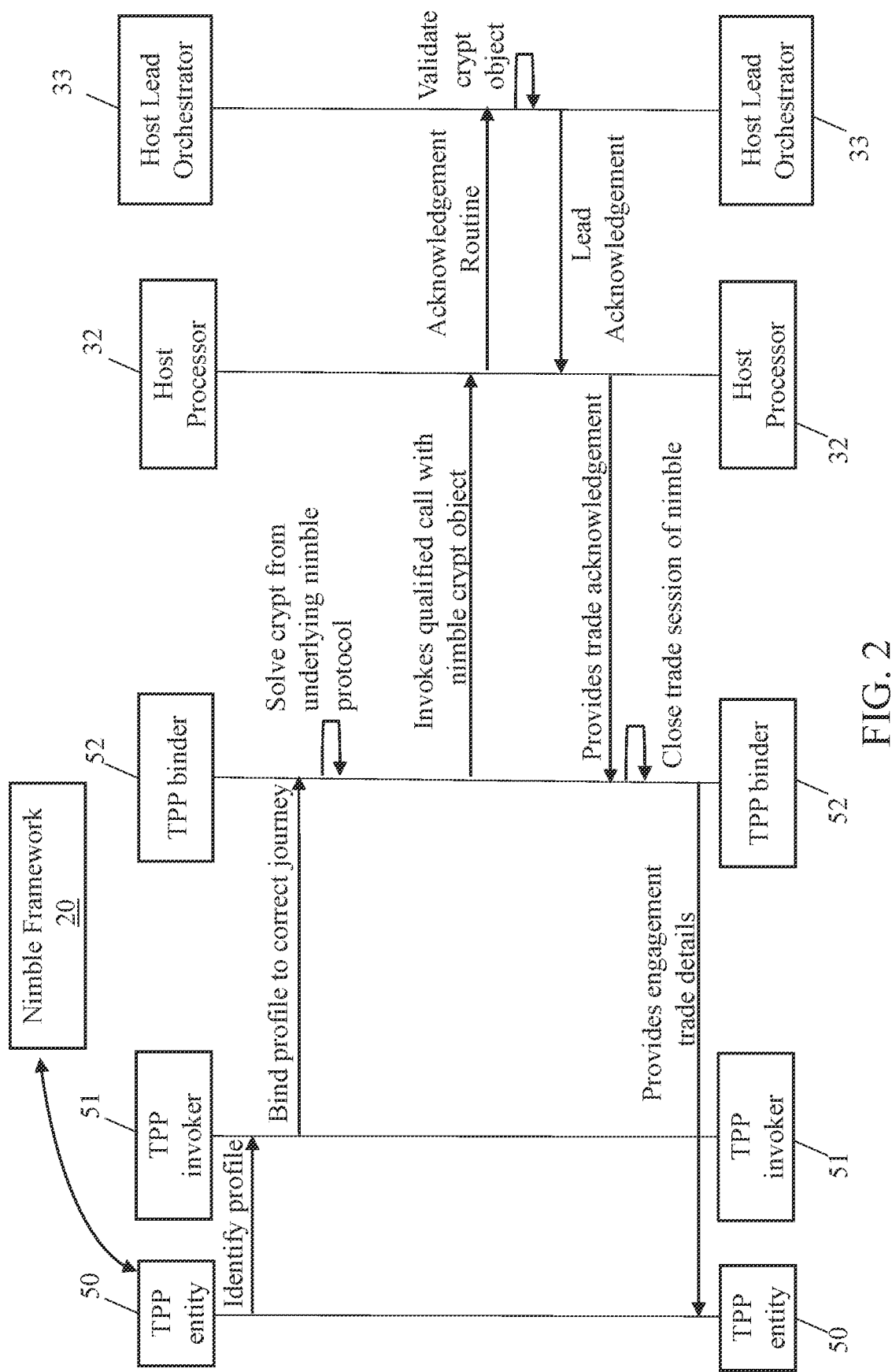
FIG. 2 is a flow/block diagram illustrating the high level steps of a method for using hybrid edge computing including hybrid edge provisioning of servers, in accordance with some embodiments of the present disclosure.

FIG. 1 is an illustration of an architecture for hybrid edge provisioning. FIG. 2 is an illustration of a block diagram depicting one embodiment of a method for hybrid edge provisioning.

Described is a method and framework for hybrid edge provisioning and computing based on concept of nimble protocol invocation, decision binder, orchestrator, nimble crypt object which assist organization to be digital autonomous.

The Protocol Framework for executing Edge cloud functions depends on the type of the QoS requirement, i.e., agreed delay, bandwidth available runtime gets decided. Depending on this perspective runtime is changing between edge provisioning server or edge server. Service provider provisions the services via implementing an agreed protocol at marketplace.

The Client request (TPPEntity i.e. Third Party Provider) for the specific services/profile via invoker, to ensure that proper service/profile is invoked out of the various available in marketplace.

The TPP Invoker passes the request object to the TPPBInder i.e. Decision Binder implementation ensure the profile selection of registered service provider available in marketplace after solving the crypt object underlying the 'Nimble' protocol.

Post successful invocation and security validation via solving crypt object, TPPBinder invokes a qualified call after adding NimbleCryptObject, hence framework ensures the security constraints are not violated throughout. As soon the service provider host system receives the request it is redirected to the host lead orchestrator which again post successful validation of nimble crypt object, send the acknowledgment which in turn confirms the trade agreed for the engagement to the TPPEntity.

In some embodiments, the methods, systems and computer program products can provide edge cloud functions with or without replication. The framework introduces virtualized functions referred as 'edge cloud functions', execution of such cloud function at the edge requires hard context and availability. These eventualities of missing Quality of Service are mitigated by working on the probable partitioning of the function runtime. A Capacitor data model is considered favorable due to time-series unstructured schema-definition of for persistence allowing for selected block replication over file driven replication.

In some embodiments, the business invocation is achieved by making a change to the required state of a virtualized business function, which is being referred to as the configuration of the replica of partition. No Replication occurs if a server has replica of partition in the initial and final configuration and no action that is required. Under these circumstances, there should be no migration of replica of partition to any server. However, that may be for very small subset of scenarios. When replication occurs, the need for a replica migration occurs if a server does not have the replica of partition in the initial configuration. This invocation is the proof of setting up a valid access that fulfills the customer journey that are outside the remit of their service catalogue.

In some embodiments, the proposed solution provides a framework for hybrid edge provisioning. Depending on the type of the quality of service (QoS) requirement, i.e., agreed delay, bandwidth, etc., available runtime gets decided. Depending on the available runtime, perspective runtime is changing for the edge provisioning server or edge server. The service provider provisions the services via implementing methods of a nimble framework at marketplace.

At marketplace, the methods, systems and computer program products mainly leverage for 3 operations, i.e., the registration of services, the identification of services, and the provisioning of services. In view of the aforementioned three operations, a user needs to add a decision binder element, and establish standard and discoverable methods of a Nimble framework that help in the identification of appropriate services available in marketplace, as per the client request type. Post request triggering framework identifies the runtime, now some of the processing happens at center, some at edge provisioning server or at edge server.

The methods, systems and computer program products include a framework that addresses the following questions in edge computing: 1) where compute gets best utilized? 2) Where the data gets persisted or replicated?, and 3) where and when the network for the edge system is provisioned?.

The systems, methods and computer program products that are described herein can broadly answer the above three questions, and categorize the system into three different types: 1) a center server, 2) an edge provisioning server, and 3) an edge server.

The system employs virtualized functions referred to as "edge cloud functions", and execution of such cloud function at the edge requires hard context and availability. Edge cloud functions runs optimally at the edge servers. In "as-is" world system pulls the real-time data through some existing process available like build-in pipelines. This latency impacts the services.

However, in the methods, systems and computer program products the above-described latency is mitigated by working on the probable partitioning of the function runtime. Business functions are thus virtualized for compute and persistence 'as a service'.

The transfer of partition, refers to the vertical slice of the requisite layers virtualized as depicted in the reference architecture. So, we can say on the back of a service request an entire business function is provisioned on the identification, i.e., placement identification for the business function for execution. Capacitor data model is considered favorable due to time-series unstructured schema-definition of for persistence allowing for selected block replication over file driven replication.

FIG. 1 illustrates one embodiment of an environment in which a nimble framework 20 for hybrid edge provisioning. There is levy of built virtualized functions depicted in FIG. 1, to invoke the functionalities in the remit of the disclosure. Service provider 30 and TPPEntity 50 are the Provider and Requestor respectively that are novated by market-making platform of Nimble 20.

The service provider includes a host 31, a nodal edge 45 and common functions 40.

The host 31 includes a host processor 32, host lead orchestrator 33, node spawner 34, node stage manager 35, node orchestrator 36, a node replicating manager 37 and a persistent writer 38. The host 31 can also include a persistent database 39.

The node edge 45 can include a node complement 46, node edge master 47 and a persistent database.

The common functions 40 can include binaries 41 and a cluster density 42.

The TPPEntity 50 can include an invoker 51, decision binder 52, service condes 53, service catalog 54, crypt/decrypt 55 and persist crypt objects 56.

The 3P5GP 60 can include an invoker 61, decision binder 62, service coder 63, service catalogue 64, crypt/decrypt 65, persisted crypt objects 66, virtualized NF 67 and network slices 68.

The nimble framework 30 may include a marketplace 21, request 22, crypt/decrypt 23, persistent crypt objects 24, decision binder 25 and service catalogue 26.

The implementation depicted in FIG. 2 shows setting up a valid access that fulfills the customer journey that are outside the remit of their service catalogue. The services are identified through the nimble framework 20, invoked on the host and the host in response ensures that the fulfilling virtualized service is provisioned near the invoking third party requestor.

The Client request (TPPEntity 50 (also referred to as Third Party Provider)) for the specific services/profile via invoker 51, ensures that proper service/profile is invoked out of the various available in marketplace 21. The TPP Invoker 51 will pass the request object to the TPPBinder 52. The TPPBinder 52, also referred to as Decision Binder implementation, ensures the profile selection of registered service provider available in marketplace after solving the crypt object underlying the 'Nimble' framework.

Post successful invocation and security validation via solving crypt object, the TPPBinder 52 will invoke a qualified call after adding NimbleCryptObject, hence framework ensures the security constraints are not violated throughout. As soon the service provider host system 31 receives the request it is redirected to the host lead orchestrator 33, which again post successful validation of nimble crypt object, send the acknowledgment which in turn confirms the trade agreed for the engagement to the TPPEntity 50.

The entity definition is as follows:
S=set of virtualized services across all cloud fabric, wherein S={$S_1, S_2, \ldots, S_i, \ldots, S_k, \ldots S_{|S|}$}.
Pj=|$P_i$| is the size of the partition
$C^I$=|S|×|P| matrix representing an initial configuration, where:

$$C_{i,j}^I = \begin{cases} 1 \text{ if replica of } p_j \text{ is stored on } S_i \\ 0, \text{ otherwise} \end{cases}$$

$C^F$=|S|×|P| matrix representing a final configuration, where:

$$C_{i,j}^F = \begin{cases} 1 \text{ if replica of } p_j \text{ is stored on } S_i \\ 0, \text{ otherwise} \end{cases}$$

The variable definition is as follows:
Y=|S|×|P|×|S| matrix representing a need for partition migration, where, $$Y_{i,j,k} = \begin{cases} 1 s_i \text{ is provider of replica of } p_j \text{ to } s_k \\ 0, \text{ otherwise} \end{cases}$$

D=|S|×|P| matrix representing the replicas the are to be deleted as time T, where, $$d_{i,j} = \begin{cases} 1 s_i \text{ has replica of } p_j \text{ will be deleted from } s_i \\ 0, \text{ otherwise} \end{cases}$$

In some embodiments, the steps of the business invocation is achieved by making a change to the required state of a virtualized business function—which is being referred to as the configuration of the replica of partition.

For example, if a server $s_k$ has replica of partition $p_j$ in the initial and final configuration and no action is required, then there should be no migration of replica of partition $p_j$ from any server $s_i$ to $s_k$.

This is then formulated as, $$\left\{\sum_{i=1}^{|S|} y_{i,j,k} = 0, d_{i,j} = 0 \right\}_{(s_k, p_j)} \quad \text{Equation (1)}$$

Otherwise, from Eq (1), we get the complement, setting up the case that the replication is required, as, $$\{[C_{k,j}^I + \Sigma_{i=1}^{|S|} y_{i,j,k} - d_{i,j} = C_{k,j}^F], [d_{i,j} > C_{k,j} - C_{k,j}^I]\}_{\forall 1 \leq k \leq |S|, 1 \leq j \leq |P|} \quad \text{Equation (2)}$$

There are some virtualized services $s_i$ that delivers the replica of partition $p_i$ to server $s_k$.

$$\{\Sigma_{i=1}^{|S|} y_{i,j,k} = 1\}_{(s_k, p_j)} \text{Equation (3)}$$

We capture the need for a replica migration if the $s_k$ does not have the replica of partition $p_i$ in the initial configuration.

$$\{\Sigma_{i=1}^{|S|} y_{i,j,k} \geq C_{k,j}^F - C_{k,j}^I\}_{\forall 1 \leq k \leq |S|, 1 \leq j \leq |P|} \quad \text{Equation (4)}$$

This invocation is the proof of setting up a valid access that fulfills the customer journey that are outside the remit of their service catalogue. The services are identified through the nimble, invoked on the host and the host in response ensures that the fulfilling virtualized service $C_{k,j}^F$ is provisioned near the invoking third party requestor.

Referring to FIG. 1, in one embodiment, the nimble framework 20 includes a hardware processor 13; and a memory 14 that stores a computer program product, which, when executed by the hardware processor, causes the hardware processor to configure internet of things (IoT) sensors along a supply chain of package; and analyze the packages in the supply chain using the IoT sensors to determine handling requirements of the products within the package. The system 100 can also track the packages with a package handling confirmation engine including a Region Based Convolutional Neural Network (RCNN) to determine with the IoT sensors measuring interactions with the packages that parties in the supply chain are handling the packages in accordance with the handling requirements; and stop product distribution through the supply chain in response to the interactions with the packages failing to meet the handling requirements.

Figure 3:
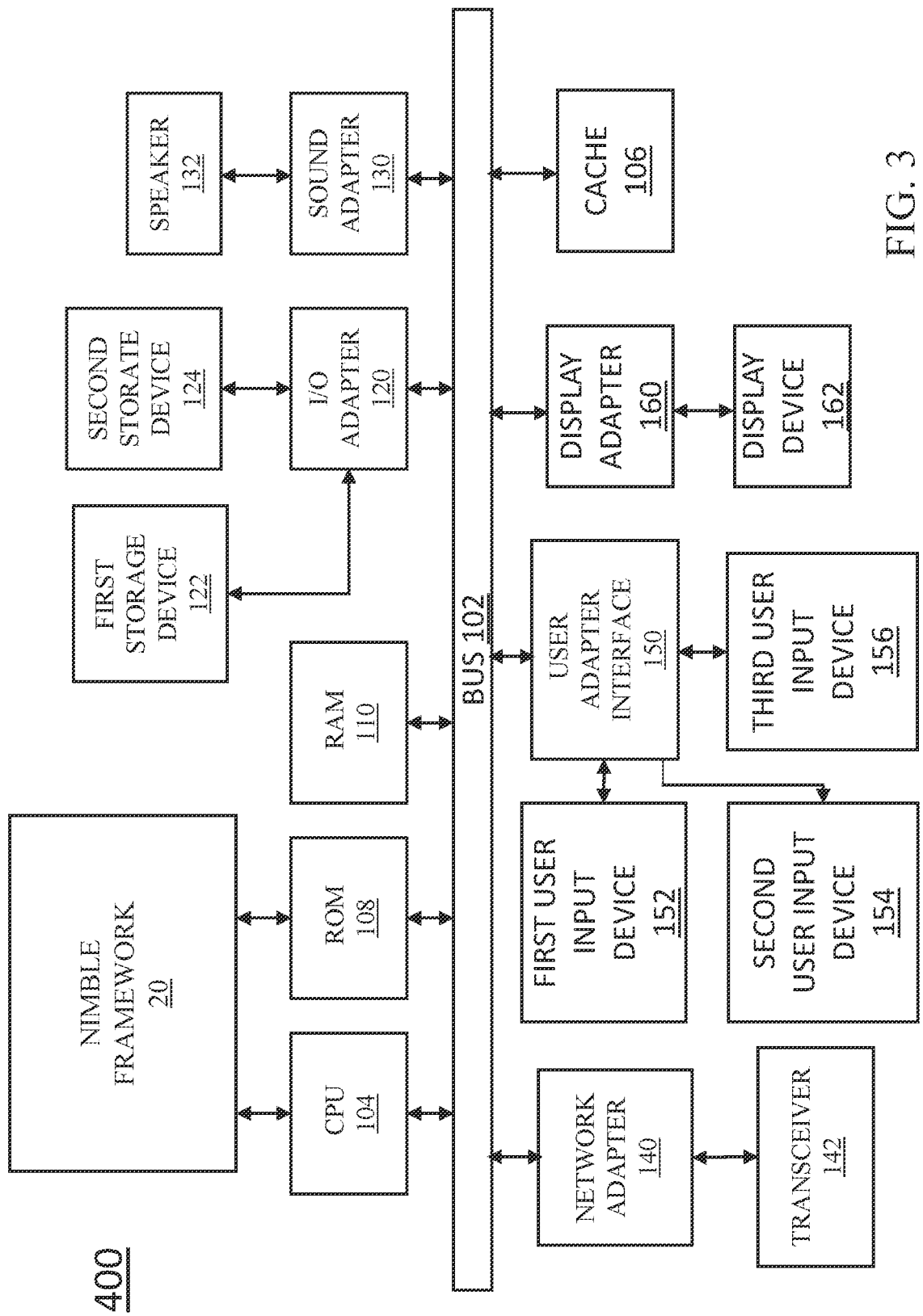
FIG. 3 is a block diagram illustrating a system that can incorporate the system for hybrid edge computing that is depicted in FIG. 1, in accordance with one embodiment of the present disclosure.

FIG. 3 illustrates a processing system 400 used by or comprised by the nimble framework 20 of FIG. 1, in accordance with the methods and systems described above in FIGS. 1 and 2. The bus 102 interconnects the plurality of components for the system 100 described above with the components depicted in the computer system 400 depicted in FIG. 3.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

Figure 5:
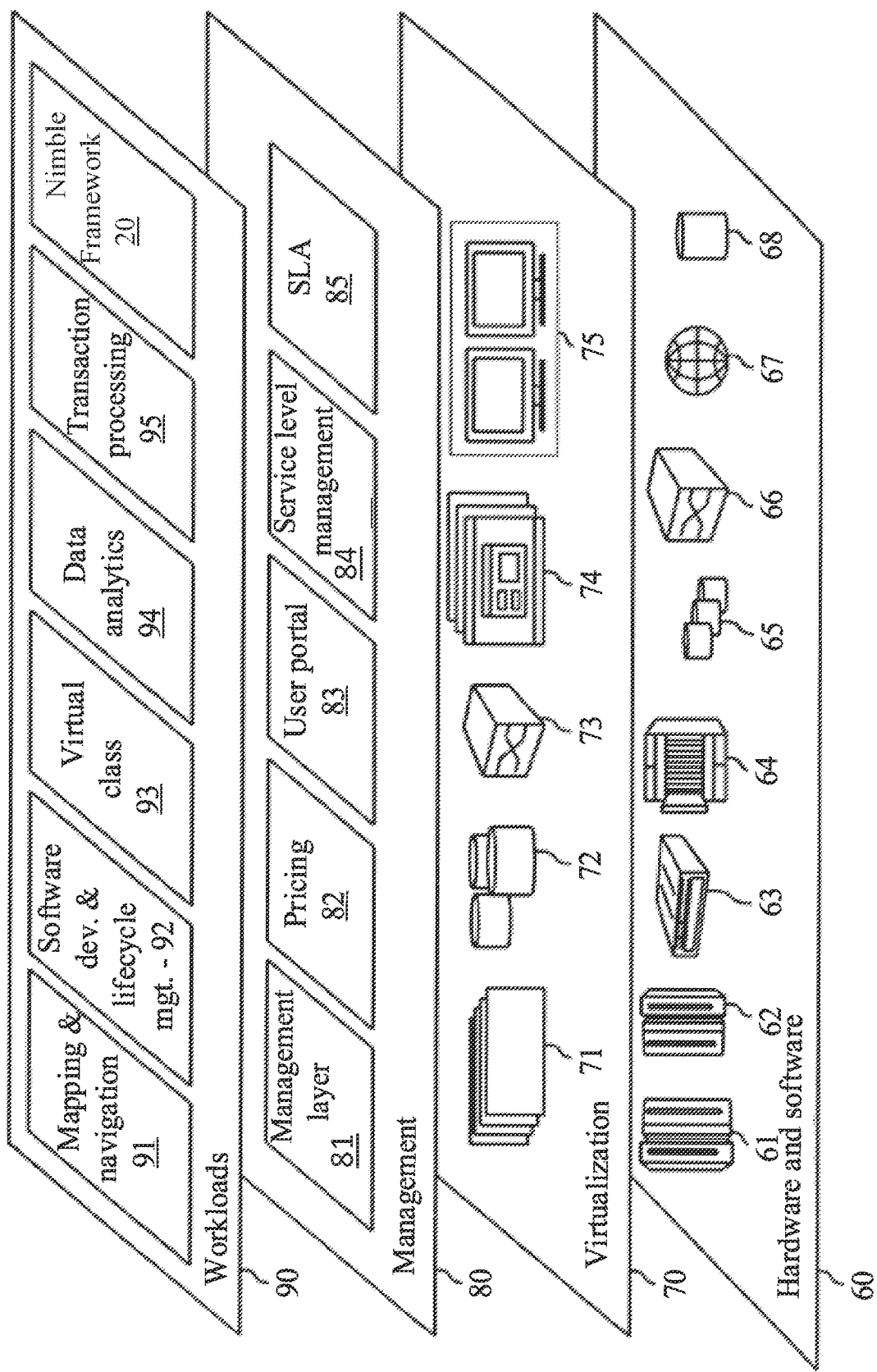
FIG. 5 depicts abstraction model layers according to an embodiment of the present disclosure.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 3 shows the computer system 400 as a particular configuration of hardware and software, any configuration of hardware and software, as would be known to a person of ordinary skill in the art, may be utilized for the purposes stated supra in conjunction with the particular nimble framework 20 of FIGS. 1 and 2. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for hybrid edge computing. The non-transitory computer readable program when executed on a computer causes the computer to perform the steps of identifying using the processor services available in a marketplace using a nimble framework, wherein the nimble framework defines a location for computing the services selected from the group consisting of a center server, an edge provision server and an edge node. The computer program product can also receive, using the processor requests by a third party provider for a service to the nimble framework. Finally, the computer program product can also deliver, using the processor, virtualized services by the nimble framework to the third party provider including a matched service to the third party provider request for the service, and an optimal location for computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 4:
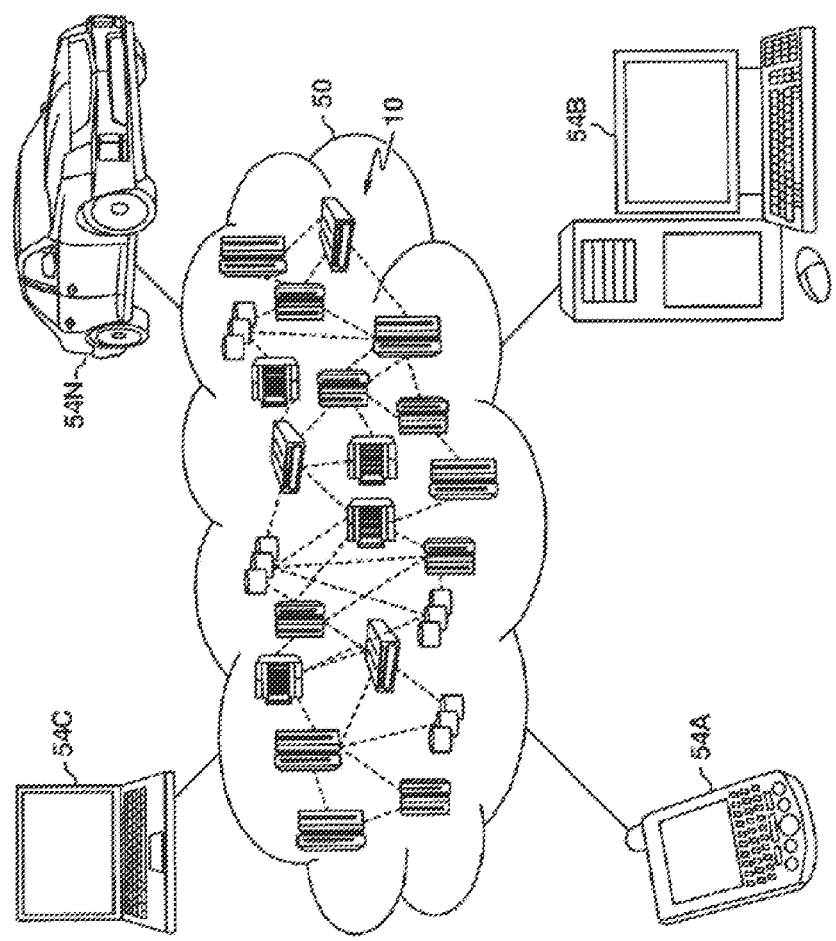
FIG. 4 depicts a cloud computing environment according to an embodiment of the present disclosure.

Referring now to FIG. 4, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a cognitive recognition model to maximize the business impact 96 in hardware devices in accordance with FIGS. 1-5.

Having described preferred embodiments of methods, systems and computer program products for hybrid edge computing it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method is described for creating an entity relationship diagram comprising:
    identifying services available in a marketplace using a decision binder in a nimble framework that mitigates latency by partitioning virtualized functions of the services available in the marketplace based on an identified runtime of the virtualized functions which are processed in different locations by migrating replicas of partition to different locations, the nimble framework including a crypt object for security that when solved indicate a third party provider has access to the service, wherein the nimble framework defines a location optimized in accordance with a computed runtime for the services selected from a group consisting of a central cloud server, an edge provision server and an edge node, wherein to define the location optimized in accordance with the computed runtime for the services, the nimble framework analyzes an amount of data for the services, a compute capacity of the location, a bandwidth of the location and an agreed delay, the location optimized in accordance with the computed runtime for the services being selected autonomously by the nimble framework based upon lowest runtime for the services being performed at the location;
    requesting by the third party provider for a service to the nimble framework; and
    delivering virtualized services by the nimble framework to the third party provider including a matched service to the third party provider request for the service, and an optimal location for computing.

2. The computer-implemented method of claim 1, wherein the nimble framework includes a decision binder for adding a NimbleCryptObject to the request after invocation and security validation.

3. The computer-implemented method of claim 1, wherein the bandwidth is defined by a quality of service requirement for the location.

4. The computer-implemented method of claim 1, wherein the third party provider includes an invoker that passes the request to a decision binder to ensure a profile selection of service provider is in the marketplace after solving the crypt object underlying the nimble framework.

5. The computer-implemented method of claim 1, wherein the nimble framework ensures security constraints are not violated.

6. The computer implemented method of claim 1, wherein the location for computing the services comprises edge cloud functions with or without replication.

7. The computer-implemented method of claim 1, wherein the decision binder establishes standards and discoverable methods of the nimble framework to identify appropriate services available in the marketplace.

8. A system for hybrid edge computing comprising:
    a hardware processor; and
    a memory that stores a computer program product, the computer program product when executed by the hardware processor, causes the hardware processor to:
    identify services available in a marketplace using a decision binder in a nimble framework that mitigates latency by partitioning virtualized functions of the services available in the marketplace based on an identified runtime of the virtualized functions which are processed in different locations by migrating replicas of partition to different locations, the nimble framework including a crypt object for security that when solved indicate a third party provider has access to the service, wherein the nimble framework defines a location optimized in accordance with a computed runtime for the services selected from a group consisting of a central cloud server, an edge provision server and an edge node, wherein to define the location optimized in accordance with the computed runtime for the services, the nimble framework analyzes an amount of data for the services, a compute capacity of the location, a bandwidth of the location and an agreed delay, the location optimized in accordance with the computed runtime for the services being selected autonomously by the nimble framework based upon lowest runtime for the services being performed at the location;
    receive requests by the third party provider for a service to the nimble framework; and
    deliver virtualized services by the nimble framework to the third party provider including a matched service to the third party provider request for the service, and an optimal location for computing.

9. The system of claim 8, wherein the nimble framework includes a decision binder for adding a NimbleCryptObject to the request after invocation and security validation.

10. The system of claim 8, wherein the bandwidth is defined by a quality of service requirement for the location.

11. The system of claim 8, wherein the third party provider includes an invoker that passes the request to a decision binder to ensure a profile selection of service provider is in the marketplace after solving the crypt object underlying the nimble framework.

12. The system of claim 8, wherein the nimble framework ensures security constraints are not violated.

13. The system of claim 8, wherein the location for computing the services comprises edge cloud functions with or without replication.

14. A computer program product for hybrid edge computing comprising a computer readable storage medium having computer readable program code embodied therewith the computer readable program code executable by a processor to cause the processor to:

identify, using the processor, services available in a marketplace using a decision binder in a nimble framework that mitigates latency by partitioning virtualized functions of the services available in the marketplace based on an identified runtime of the virtualized functions which are processed in different locations by migrating replicas of partition to different locations, wherein the nimble framework defines a location optimized in accordance with a computed runtime for the services selected from a group consisting of a central cloud server, an edge provision server and an edge node, wherein to define the location optimized in accordance with the computed runtime for the services, the nimble framework analyzes an amount of data for the services, a compute capacity of the location, a bandwidth of the location and an agreed delay, the location optimized in accordance with the computed runtime for the services being selected autonomously by the nimble framework based upon lowest runtime for the services being performed at the location;

receive, using the processor, requests by a third party provider for a service to the nimble framework; and deliver, using the processor, virtualized services by the nimble framework to the third party provider including a matched service to the third party provider request for the service, and an optimal location for computing.

15. The computer program product of claim 14, wherein the nimble framework includes a decision binder for adding a NimbleCryptObject to the request after invocation and security validation.

16. The computer program product of claim 14, wherein the bandwidth is defined by a quality of service requirement for the location.

17. The computer program product of claim 14, wherein the third party provider includes an invoker that passes the request to a decision binder to ensure a profile selection of service provider is in a marketplace.

18. The computer program product of claim 14, wherein the nimble framework ensures security constraints are not violated.

* * * * *